United States Patent [19]
Storey et al.

[11] Patent Number: 5,765,863
[45] Date of Patent: Jun. 16, 1998

[54] AIRBAG CUSHION HAVING COMPRESSION-DEPLOYED SECTION

[75] Inventors: J. Kirk Storey, Farmington; Brent K. Olson, Clearfield; Larry F. Lunt, Brigham City; Davin G. Saderholm, Salt Lake City; Daniel G. Minert, Clearfield, all of Utah

[73] Assignee: Morton International, Inc., Chicago, Ill.

[21] Appl. No.: 871,463

[22] Filed: Jun. 9, 1997

Related U.S. Application Data

[63] Continuation of Ser. No. 625,438, Mar. 27, 1996, abandoned.

[51] Int. Cl.⁶ .................................................. B60R 21/24
[52] U.S. Cl. .................................. 280/729; 280/743.1
[58] Field of Search .............................. 280/729, 743.1

[56] References Cited

U.S. PATENT DOCUMENTS

| | | | |
|---|---|---|---|
| 2,834,606 | 10/1958 | Bertrand | 280/730.1 |
| 3,473,824 | 10/1969 | Carey et al. | |
| 3,476,402 | 11/1969 | Wilfert | |
| 3,582,107 | 6/1971 | Goetz et al. | 280/730.1 |
| 3,642,303 | 2/1972 | Irish et al. | |
| 3,731,949 | 5/1973 | Radke | 280/743.1 |
| 3,733,091 | 5/1973 | Fleck et al. | 280/729 |
| 3,752,501 | 8/1973 | Daniel et al. | 280/729 |
| 3,768,830 | 10/1973 | Hass | 280/729 |
| 3,784,225 | 1/1974 | Fleck et al. | |
| 3,792,873 | 2/1974 | Buchner et al. | |

(List continued on next page.)

FOREIGN PATENT DOCUMENTS

| | | |
|---|---|---|
| 0523704 | 1/1993 | European Pat. Off. |
| 553542 | 8/1993 | European Pat. Off. |
| 0590845 | 4/1994 | European Pat. Off. |
| 0593172 | 4/1994 | European Pat. Off. |
| 0611684 | 8/1994 | European Pat. Off. |
| 0703123 | 3/1996 | European Pat. Off. |
| 0769428 | 4/1997 | European Pat. Off. |
| 2030863 | 12/1971 | Germany |
| 2944319 | 5/1981 | Germany |
| 4019596 | 1/1992 | Germany |
| 4204280 | 8/1992 | Germany |
| 4137691 | 12/1992 | Germany |
| 4307175 | 9/1993 | Germany |
| 4307421 | 10/1993 | Germany |
| 4217174 | 11/1993 | Germany |
| 19517764 | 11/1996 | Germany |
| 3741637 | 6/1989 | Japan |
| 2249740 | 10/1990 | Japan |
| 3067748 | 3/1991 | Japan |
| 367749 | 3/1991 | Japan |
| 3136943 | 6/1991 | Japan |

(List continued on next page.)

OTHER PUBLICATIONS

"Side Impact Protection by Airbag Padded Door", Yngve Håland, Electrolux Autoliv AB, No date given.

*Primary Examiner*—Kenneth R. Rice
*Attorney, Agent, or Firm*—Taylor J. Ross; Gerald K. White

[57] ABSTRACT

An airbag module having a cushion with a compression-deployed volume. The module includes an inflator which produces a quantity of inflation gas. This gas inflates only a first volume of the cushion, which is positioned to protect a first portion of a passenger's body. Compression of the first volume by the passenger forces the gas from the first volume into a second volume, to thus inflate the second volume. The second volume is positioned to protect a second portion of the passenger's body. The initial quantity of inflation gas is thus reused, reducing the amount of gas required. This in turn reduces the size and cost of the inflator. The module is preferred for side impact protection, and a fold arrangement suited to accurate deployment is provided. The folded cushion may be secured to the inflator by a frangible film wrap, eliminating the need for an exterior housing. The module is preferably mounted upon the side of the passenger seat back.

25 Claims, 7 Drawing Sheets

U.S. PATENT DOCUMENTS

| | | | |
|---|---|---|---|
| 3,795,414 | 3/1974 | Ventre et al. | 280/730.1 |
| 3,802,719 | 4/1974 | Brown | 280/729 |
| 3,879,057 | 4/1975 | Kawashima et al. . | |
| 3,892,425 | 7/1975 | Sakairi et al. | 280/743.1 |
| 3,897,961 | 8/1975 | Leising et al. | 280/730.1 |
| 3,990,726 | 11/1976 | Oka et al. . | |
| 4,186,941 | 2/1980 | Scholz et al. . | |
| 4,262,931 | 4/1981 | Strasser et al. | 280/729 |
| 4,360,223 | 11/1982 | Kirchoff . | |
| 4,946,191 | 8/1990 | Putsch | 280/730.2 |
| 4,964,654 | 10/1990 | Bishop et al. . | |
| 4,966,388 | 10/1990 | Warner et al. | 280/730.1 |
| 5,018,762 | 5/1991 | Suzuki et al. | 280/731 |
| 5,022,675 | 6/1991 | Zelenak, Jr. et al. . | 280/743.1 |
| 5,033,236 | 7/1991 | Szerdahelyi et al. | 49/502 |
| 5,048,863 | 9/1991 | Henseler et al. | 280/743.1 |
| 5,100,172 | 3/1992 | VanVoorhies et al. | 280/738 |
| 5,129,675 | 7/1992 | Wang | 280/743.1 |
| 5,160,164 | 11/1992 | Fischer et al. | 280/743.2 |
| 5,172,790 | 12/1992 | Ishikawa et al. | 180/268 |
| 5,193,847 | 3/1993 | Nakayama | 280/738 |
| 5,224,732 | 7/1993 | Warner et al. | 280/730.2 |
| 5,240,282 | 8/1993 | Wehner et al. | 280/728 |
| 5,240,283 | 8/1993 | Kishi et al. | 280/729 |
| 5,246,250 | 9/1993 | Wolanin et al. | 280/739 |
| 5,249,824 | 10/1993 | Swann et al. | 280/729 |
| 5,253,892 | 10/1993 | Satoh | 280/731 |
| 5,282,646 | 2/1994 | Melvin et al. | 280/729 |
| 5,290,061 | 3/1994 | Bollaert | 280/743.1 |
| 5,310,214 | 5/1994 | Cuevas | 280/729 |
| 5,324,072 | 6/1994 | Olson et al. | 280/730.2 |
| 5,333,899 | 8/1994 | Witte | 280/730.2 |
| 5,340,151 | 8/1994 | Sato | 280/743 R |
| 5,348,342 | 9/1994 | Haland et al. | 280/730.2 |
| 5,358,273 | 10/1994 | Onishi et al. | 280/743.1 |
| 5,375,878 | 12/1994 | Ellerbrok | 280/743.1 |
| 5,445,407 | 8/1995 | Lotspih | 280/728.2 |
| 5,454,595 | 10/1995 | Olson et al. | 280/743.1 |
| 5,468,012 | 11/1995 | Mihm | 280/728.2 |
| 5,470,104 | 11/1995 | Smith et al. | 280/737 |
| 5,498,030 | 3/1996 | Hill et al. | 280/743.1 |
| 5,503,428 | 4/1996 | Awotwi et al. | 280/730.2 |
| 5,503,429 | 4/1996 | Wallner et al. | 280/743.1 |
| 5,511,821 | 4/1996 | Meyer et al. | 280/743.1 |
| 5,513,877 | 5/1996 | Mac Brien et al. . | |
| 5,520,413 | 5/1996 | Mossi et al. | 280/729 |
| 5,524,924 | 6/1996 | Steffens, Jr. et al. | 280/730.2 |
| 5,547,214 | 8/1996 | Zimmerman, II et al. | 280/730.1 |
| 5,570,900 | 11/1996 | Brown | 280/729 |
| 5,586,782 | 12/1996 | Zimmerman, II et al. | 280/730.2 |
| 5,599,040 | 2/1997 | Takahashi et al. | 280/729 |
| 5,632,506 | 5/1997 | Shellabarger | 280/743.1 |

FOREIGN PATENT DOCUMENTS

| | | |
|---|---|---|
| 3276844 | 9/1991 | Japan . |
| 3281460 | 12/1991 | Japan . |
| 424142 | 1/1992 | Japan . |
| 5208647 | 8/1993 | Japan . |
| 61188 | 1/1994 | Japan . |
| 6227348 | 8/1994 | Japan . |
| 6286568 | 10/1994 | Japan . |
| 6305391 | 11/1994 | Japan . |
| 7069149 | 3/1995 | Japan . |
| 9406568 | 11/1994 | South Africa . |
| 1326671 | 8/1973 | United Kingdom . |
| 2232936 | 1/1991 | United Kingdom . |
| 2232936 | 2/1991 | United Kingdom . |
| 2266075 | 10/1993 | United Kingdom . |
| 2283463 | 5/1995 | United Kingdom . |

AIRBAG CUSHION HAVING COMPRESSION-DEPLOYED SECTION

This is a continuation of U.S. application Ser. No. 08/625,438 filed 27 Mar. 1996, now abandoned.

This application is related to U.S. Pat. No. 5,454,595, filed Sep. 08, 1994, and issued Oct. 03, 1995, which is incorporated by reference herein and made a part hereof, including but not limited to those portions which specifically appear hereinafter.

BACKGROUND OF THE INVENTION

1. Field of the Invention

The present invention relates in general to airbag passive restraint systems. In particular, the present invention relates to an improved cushion and cushion fold arrangement, preferably for side impact collision protection.

2. Description of the Related Art

Airbag passive restraint systems are increasingly common, and typically include several basic components. A typical airbag system includes an inflator for generating a quantity of gas. A cushion is connected to the inflator to receive the gas, and thus inflate the cushion. The actual inflation of the cushion occurs over a very short period of time, typically on the order of 10 milliseconds for front impact cushions and 6 milliseconds for side impact cushions. In the uninflated state, the cushion is often mounted to or with the inflator, and both the inflator and cushion are typically enclosed within a housing. The combination of a housing, inflator and cushion is typically referred to as a module.

The single most important design consideration for an airbag module is of course passenger safety. While this criteria is always foremost, it is also desirable to make modules smaller, lighter, and less expensive. Previous efforts to reduce size, weight and cost have, for example, resulted in the elimination of walls within the inflator between the gas generant pellets and the filter. Recent trends include fluid fueled inflators, such as shown in U.S. Pat. No. 5,470,104 to Smith et al. and assigned to the assignee of the present invention, and an attachment between the cushion and inflator which permits the cushion to be secured in its folded state to the inflator by a frangible film wrap, eliminating the housing, as shown in copending U.S. application Ser. No. 08/543,953 to Bunker et al., which is incorporated by reference herein and made a part hereof, including but not limited to those portions which specifically appear hereinafter.

In previous designs, the cushion was inflated to the full size needed to protect the desired portion(s) of the passenger's body, typically the chest or torso, and the head. While it has been known that the different parts of the body do not compress the cushion at the same time (for example, the head typically follows the torso), this fact has not been exploited to alter module design for reduced size, weight and cost, while still providing complete passenger safety.

SUMMARY OF THE INVENTION

An object of the present invention is to provide an airbag module providing passenger safety while reducing size, weight and cost.

Another object of the present invention is to provide an airbag module which produces a reduced amount of inflation gas, yet reuses this gas to cushion different parts of the passenger's body at different times during a single collision.

A further object of the present invention is to provide an airbag module which inflates a first cushion volume to protect a first part of the passenger's body, with the compression of the first volume forcing the same gas into a second cushion volume to protect a second part of the passenger's body.

Another object of the present invention is to provide a method of protecting a passenger by inflating a first volume, compressing the first volume with a first part of the passenger's body to cushion the impact of a collision, and by this compression forcing the same gas into a second volume which is then compressed by, and cushions, a second part of the passenger's body.

Yet another object of the present invention is a side impact module that provides these features, in addition to others.

A further object of the present invention is a method of folding a cushion for such a side impact module which provides small folded size and accurate deployment to the proper position.

These and other objects are achieved by an airbag module having a cushion with a compression-deployed volume. The module includes an inflator which produces a quantity of inflation gas. This gas inflates only a first volume of the cushion, which is positioned to protect a first portion of a passenger's body. Compression of the first volume by the passenger forces the gas from the first volume into a second volume, to thus inflate the second volume. The second volume is positioned to protect a second portion of the passenger's body. The initial quantity of inflation gas is thus reused, reducing the amount of gas required. This in turn reduces the size and cost of the inflator. The module is preferred for side impact protection, and a fold arrangement suited to accurate deployment is provided. The folded cushion may be secured to the inflator by a frangible film wrap, eliminating the need for an exterior housing. The module is preferably mounted upon the side of the passenger seat back.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
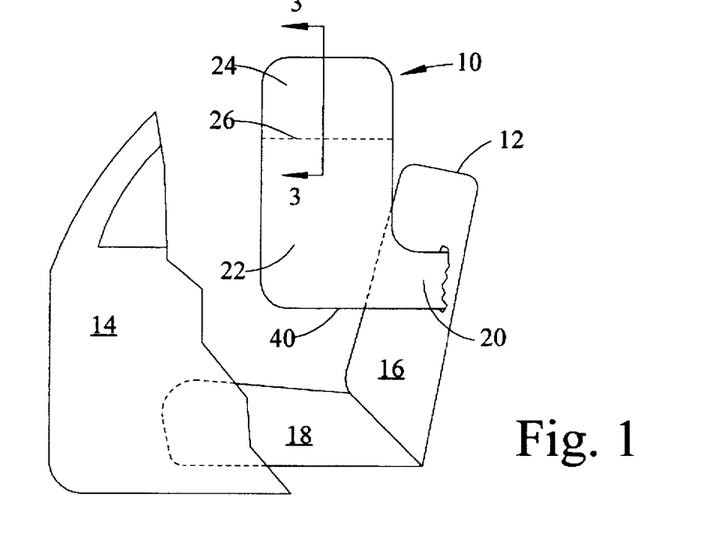
FIG. 1 is a detail side view showing a cushion according to the present invention mounted in a vehicle.

With reference to FIG. 1, a cushion according to the present invention is generally designated by reference numeral 10. As shown, the cushion is located within the passenger cabin of a vehicle. In its general form, the cushion 10 could be located at any position within the cabin known to be provided with an airbag passive restraint. Suitable locations include the dashboard to protect a passenger, the steering wheel to protect the driver, the rear of the seats to protect the rear passengers, the ceiling, doors, etc. In the preferred form, the cushion 10 is located to act as a side-impact passive restraint. As such, when deployed the cushion will be located intermediate a seat 12 and a cabin side 14 (typically a door). More particularly, the cushion will be intermediate a portion of the body of the passenger seated in seat 12 and the side 14.

Prior to deployment, the folded cushion 10 may be located at any location which will permit it to expand to its deployed condition within the small amount of time required. For the preferred side-impact use, suitable locations include the cabin roof above the cabin side 14, a pillar (not shown) or other cabin element adjacent the side 14, the side 14 itself (e.g., in the door), and the seat 12. It is preferred that the cushion be mounted to the seat 12. This is because seats in vehicles are often movable to accommodate passengers of different sizes. Mounting the cushion to the seat 12 will thus result in proper placement of the cushion with respect to the seat (and thus most likely the passenger in the seat), regardless of the seat position.

Vehicle seats typically include a back 16 and a bottom 18. The cushion could be mounted to the exterior side of the bottom 18 if desired. However, since protection is often only necessary for the chest and head region of the passenger, it is preferred that the cushion be mounted to the exterior side of the seat back 16, as shown in FIG. 1.

As shown in FIG. 1, the cushion (in the form of a side-impact cushion) may take the general form of an "L", with the foot of the L being formed by an extension section 20. The upright of the L includes a first volume 22 in direct communication with the extension section 20. The upright also includes a second volume 24 in communication with the first volume. The first and second volumes are separated along a demarcation line 26.

In use, the first volume 22 is inflated with a quantity of gas, but the second volume is not inflated. As the passenger compresses the first volume to absorb the force of the collision, the gas is forced into the second volume, causing its inflation. The passenger may then compress the second volume for further protection.

This arrangement is suitable because the human body is jointed at the neck, shoulders, hips, etc. This jointing results in movement between the various parts of the body during a collision. This movement in turn results in different parts of the body requiring protection at different times. This is illustrated in FIGS. 2a–d.

These figures depict the motion of the human body, and the action of the present invention, during a side impact collision. In each figure there is shown a passenger 28 having a pelvic region 30, a torso 32, and a head 34. Passenger 28 is seated in the seat 12, and is adjacent to the side 14 of the vehicle. As noted, the jointing of the human body permits relative movement between the torso 32 and pelvic region 30, and between the torso 32 and head 34. Passenger 28 would also typically have limbs jointed to the torso (shoulders) and pelvic region, but these limbs are considered less critical for injury prevention, and are typically adequately protected along with the rest of the body, or by other passive restraint systems.

Figure 2A:
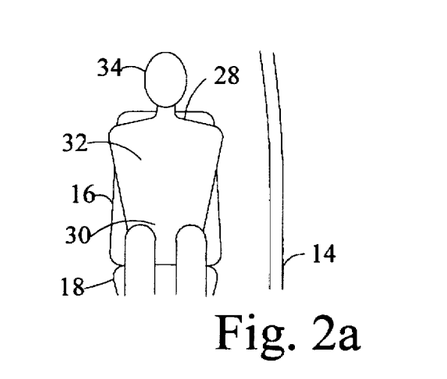
FIGS. 2a–d are illustrations of the motion of a passenger, and inflation of the cushion of the present invention, during a collision.
Figure 2B:
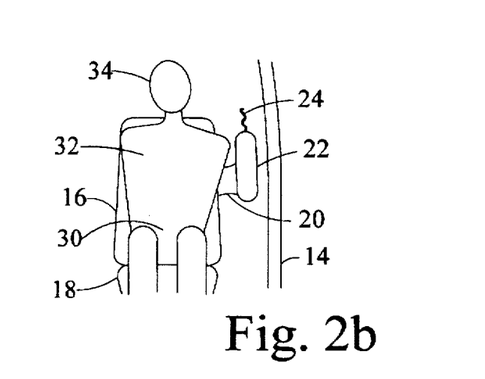

FIG. 2a depicts passenger 28 the instant before a side impact collision. At this instant the passenger is upright, with the torso extending vertically from the pelvic region, and the head aligned with the torso. FIG. 2b depicts the first instants of the side-impact collision. The force of the collision is directed upon the side 14 in a direction to the left in the figure. As such, the vehicle is subject to a high acceleration toward the left. The seat 12, being secured to the vehicle, is also subject to this acceleration.

The passenger 28 is resting in the seat 12, and thus the acceleration is transferred to the passenger. However, the passenger is not rigidly secured to the seat, and the passenger is not rigid. As is well known, objects at rest will stay at rest until acted upon by a force. Here, the passenger will tend to stay at rest until acted upon by the seat accelerating toward the left.

The pelvic region 30 is somewhat secured to the seat bottom 18 due to the large amount of surface contact and the force of the upper body pressing against the seat bottom. As such, the pelvic region will be accelerated to the left. Some sliding on the seat will occur, but this is not illustrated for clarity.

While the pelvic region is accelerated toward the left, the contact between the seat back 16 and the torso 32 is not nearly so great as that with the pelvic region. As such, the torso 32 tends to stay at rest to a greater extent. This results in the pelvis accelerating left with respect to the torso, causing the torso to rotate clockwise about the pelvic region. In a similar manner, the head 34 tends to stay at rest. The rotation of the torso in turn induces a counterclockwise rotation of the head.

Figure 2C:
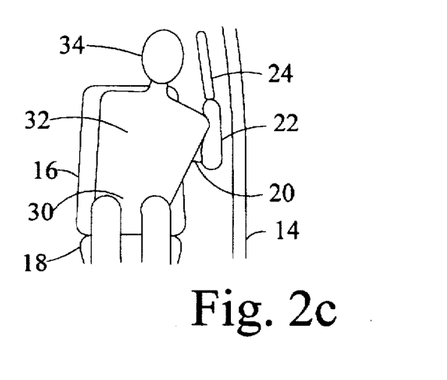

It is noted that at this time the cushion 10 has deployed, and the first volume 22 is filled to a pressure $P_1$ which is sufficient to provide protection to the torso. The second volume 24 is not inflated at this time. FIG. 2c illustrates a slightly later time, where the acceleration of the pelvic region has continued, causing further rotation of the torso. The rotation of the torso is sufficient that it has engaged the first volume 22, and is compressing the first volume. This compression has nearly stopped the rotation of the torso, and the head 34, which has been moving to the right following the torso, continues in its movement, causing the head to begin rotating clockwise, opposite to its original rotation.

The compression of the first volume has exerted a force to slow the movement of the torso without causing injury. Conversely, the force applied to compress the first volume has increased the pressure within the first volume above a predetermined threshold pressure $P_2$. As such, the gas within the first volume has begun to flow into the second volume, beginning its inflation. This inflation will continue at least during the time that the first volume is compressed.

Figure 2D:
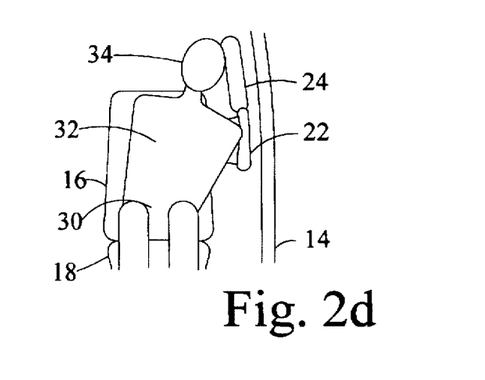

With reference to FIG. 2d, at a slightly later time the movement of the torso has been stopped completely by the force exerted by the compressed first volume. Although the torso has been stopped, the head 34 continues its relative movement to the right and its clockwise rotation. In this figure the second volume has been fully inflated, and is positioned to protect the head 34. In a manner similar to the torso and first volume, the head 34 has just begun to compress the second volume, protecting the head. During compression of the second volume, the gas may be vented to permit the desired compression. Alternatively or additionally, a portion of the gas may be forced back into the first volume to permit the compression. Furthermore, as the gas cools, the pressure will also decrease, again softening compression.

As may be seen, the motion of the passenger's body is not rigid, and flexing of the joints will occur. This in turn results in different portions of the body being in different positions at any particular time. More importantly, the different positions of the various portions of the body means that the cushion exerts force upon the different portions at different times. It is this fact which is exploited in the present invention to deploy the cushion in sections timed to apply force to only those portions which currently are in the proper position. Furthermore, the unique use of the force-applying compression to cause the later inflation of subsequent sections of the cushion permits the inflation gas to be reused for applying force in the different section of the cushion. In this manner excellent protection is provided to the passenger, while less gas is required. This permits the use of a smaller, lighter and less expensive inflator.

As may be envisioned, the demarcation line 26 between the first and second volumes must provide a mechanism which restricts gas flow sufficiently to permit the first volume to achieve the pressure $P_1$, without inflating the second volume. This mechanism must also permit the gas to flow quickly from the first volume to the second volume when the pressure in the first volume exceeds the pressure $P_2$ due to compression by the passenger's body. Various mechanisms may be employed to achieve this result.

It is first noted that the particular mechanism employed will depend to a certain extent upon the construction and shape of the cushion 10. For example, many cushions are formed by simply placing two nearly identical sheets of suitable fabric one upon the other, and sewing about the aligned edges. This is often the case for driver side and side-impact cushions. Other cushions are more complex, and may take the form of a central strip of fabric bent into a U shape, with side panels sewn to each edge of the central strip along the crossbar and legs of the U shape. Such a cushion is typically employed for passenger side protection. Beyond these basic forms, cushions have been employed which have lobes or protrusions extending outward from the main body of the cushion. For simplicity and brevity, the mechanism for controlling flow will be described with regard to a simple, and preferred, cushion construction. Those skilled in the art will readily recognize adaptations for use in other, more complex, cushion constructions.

Figure 3:
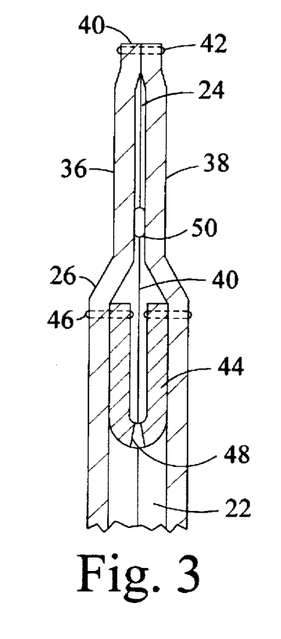
FIG. 3 is a cross-sectional view along line 3—3 of FIG. 1.

With reference to FIG. 3, a first mechanism for controlling flow is illustrated. As shown, the cushion 10 is constructed of first and second sheets 36 and 38 of suitable fabric, each having a peripheral edge 40 in the L shape shown in FIG. 1. The sheets have been laid upon each other and sewn about the majority of the aligned edges, as illustrated by sew line 42. Other methods of securing the edges together, such as adhesives, heat bonding, ultrasonic bonding, etc. could also be used.

As shown, in this embodiment the demarcation line 26 between the first and second volumes 22 and 24 is formed by a baffle 44. The baffle takes the form of a rectangular strip of fabric, preferably of the same type used to form the first and second sheets. The rectangular baffle is located between the sheets 36 and 38, with the short edges of the rectangle adjacent the vertical peripheral edges 40 of the cushion, and each of the long edges secured to a respective one of the sheets 36 and 38, such as by sew line 46. The baffle includes one or more vent holes 48.

As may be envisioned, the body of the baffle prevents gas flow between the first and second volumes 22 and 24. The vent hole(s) 48, and any spacing (not shown) between the short ends of the rectangular baffle and the edges of the sheets, will permit restricted flow of gas. The amount of flow permitted will of course depend upon the size and number of the vent holes, and the size of the spaces at the ends of the baffle.

The flow may thus be adjusted by providing greater or fewer numbers of vent holes 48, changing the diameter of the vent hole(s), or shortening or lengthening the rectangular baffle 44. With regard to the end spaces, forming the baffle with a length equal to the spacing between the peripheral sew line 42 will cause the ends of the baffle to be sewn between the sheets 36 and 38 of the cushion, eliminating the end spaces. As such, for a given $P_1$ and expected compression range, the baffle may be designed to provide the desired flow to prevent initial inflation, but permit later inflation.

In this regard it is noted that simply using the baffle will permit some of the initial gas to flow directly into the second volume. However, the amount of gas will not be sufficient to cause true operative inflation, and thus meets the definition of "uninflated" as used herein.

If it is desired to seal the second volume to a greater degree, it is possible to form a frangible seal line 50 along the demarcation line. As shown in FIG. 3, the frangible line may be formed of an adhesive which will secure the sheets 36 and 38 together at the pressure $P_1$, but will fail at the pressure $P_2$. As an alternative, the frangible line may be discontinuous, and formed in segments, such that the spaces between the frangible line segments (or the segments and the edges of the sheets) permit the passage of gas and act similar to vent holes 48. Still further, it is possible to employ both the baffle and the frangible seal line. With such an arrangement little or none of the initial quantity of gas would be lost to the second volume due to the seal line. However, upon failure of the seal line the flow from first volume 22 to second volume 24 would be controlled, perhaps providing improved cushioning in the first volume.

In the embodiment of FIG. 3 the uninflated second volume 24 simply extends outward from the first volume, and is essentially flaccid prior to inflation. Since deployment of an airbag cushion is extremely rapid, this may result in the uninflated second volume flapping about, and possibly striking the passenger. To avoid this, there are several arrangements possible.

Figure 4:
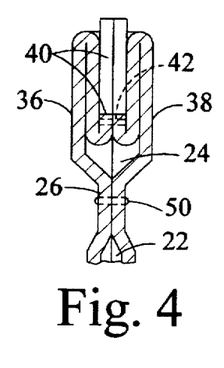
FIGS. 4–7 are alternative arrangements to that shown in FIG. 3.

With reference to FIG. 4, the demarcation line 26 is provided by a frangible seal line 50 in the form of a tear seam, as will be the case for the remaining options discussed below. To secure the second volume, the portions of the sheets which form the second volume are folded inward (i.e., inverted) to form a concavity at the upper edge of the second volume. While there remains some portion of the second volume which is free to flap, the length has been reduced by approximately half, and the flexibility is reduced due to the double thickness. As may be envisioned, upon breaking of the frangible seal line the second volume will inflate to its full size and shape.

Figure 5:
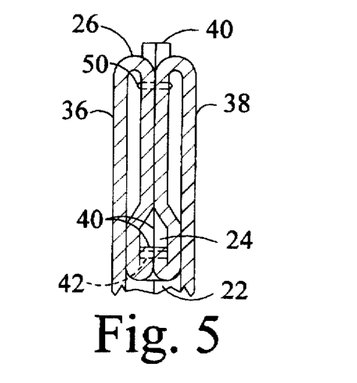

A further option is shown in FIG. 5. In this embodiment the portion of the sheets forming the second volume have been folded inward in their entirety, so that the entire second volume is inverted, and is received below the demarcation line 26 and within the first volume 22. With this arrangement there is no portion of the second volume available to flap. It is noted that the frangible line 50 in this embodiment would have to be formed before the cushion peripheral sew line is completed. As an alternative, the frangible line 50 could be sewn through all four layers of the sheets, permitting easier assembly.

Figure 6:
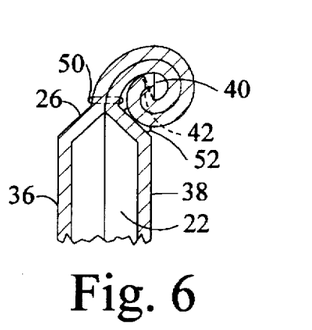
Figure 7:
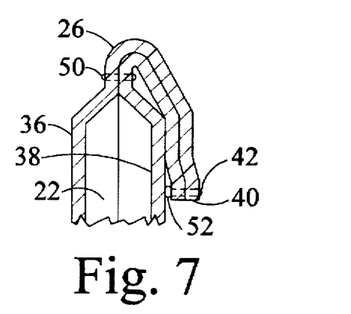

FIGS. 6 and 7 do not employ the inward fold arrangement, but instead generally fold the second volume over. As shown in FIG. 6, the upper edge of the second volume has been rolled downward to the demarcation line 26. Thereafter the exterior layer of the rolled second volume is secured to the exterior of one of the sheets 36 or 38 forming the first volume, such as by an adhesive 52. In a slight variation, in FIG. 7 the upper edge of the second volume is rotated to form a fold line along the demarcation line. The folded over second volume is then secured to the exterior of one of the sheets forming the first volume.

In the embodiments of FIGS. 6 and 7 the demarcation line includes the frangible seal line 50, in the form of a tear seam. However, due to the fold provided in each case, it may be possible to eliminate the seal line 50 entirely. Specifically, the fold line will provide a restriction to the inflation gas. This restriction may be sufficiently strong that the seal line 50 is not necessary. As may be envisioned, even if the fold provides only an initial restriction, the first volume will begin to inflate, causing the fold line to be more secure, increasing the flow restriction provided by the fold line. As with the seal line, however, the force applied through the fabric forming the first and second volumes will still cause the adhesive to fail, and the fold line to unfold, at the pressure $P_2$. It should also be understood that while tear seams have been shown for the frangible seal lines of FIGS. 4-7, adhesives, heat bonding, ultrasonic bonding, etc. could also be employed.

In each of the arrangements described above, it should be clear that the first volume vents into the second volume. This venting provides the controlled pressure drop which allows the first volume to collapse in a manner to provide protective support to the passenger. As noted, the mere size of the opening(s) to the second volume, or the addition of a baffle may be used to ensure that the pressure drop within the first volume is not too great to provide the protection needed.

Such a pressure drop is of course required in the second volume to ensure that adequate protection is provided there also. This may be achieved by venting the second volume. The venting may be back into the first volume. This would of course be possible if the first portion of the passenger's body had moved such that the first portion was no longer under compression. However, even if the first volume is still under compression, there can be some venting back into the first volume, resulting in a pressure rise within the entire combined first and second volume.

Alternatively, vents (not shown) could be provided in the fabric of sheets 36 and/or 38 forming the second volume. These vents could be fully open at all times, closed until the second volume reaches its inflation pressure, or closed until the second volume reaches some yet higher pressure due to compression by the passenger. These vents would then permit the inflation gas in the second volume to escape into the vehicle cabin to provide a controlled reduction in pressure during compression by the passenger.

As yet a further alternative, the desired pressure drop in the second volume may be achieved, partially or fully, by a reduction in temperature of the inflation gas. As is known in the art, a known amount of gas within a known volume will vary its pressure with the temperature of the gas. This principle is often used to inflate cushions by heating a quantity of stored gas. Conversely, as the gas in the cushion cools (through expansion, convection to the cushion fabric, etc.), the pressure within the cushion is reduced.

It has be en found that the use of a specific type of inflator with the cushion of the present invention will provide the advantageous result that the cooling of the gas will result in a pressure drop at the proper time to provide the desired side-impact cushioning effect in the second volume without the use of vents. Specifically, by using the present side-impact cushion with a fluid-fueled inflator, and forming the cushion of a substantially impermeable fabric, no vents need be provided.

Figures 8, 19, 20, 21, 22:
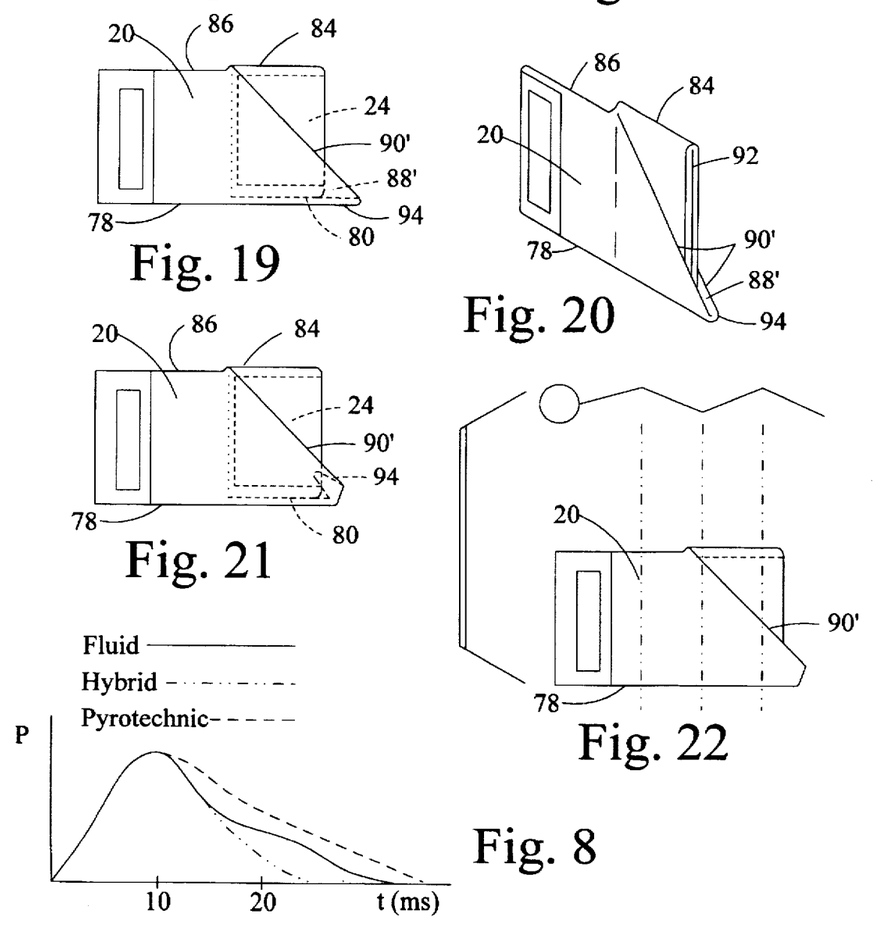
FIG. 8 is a graph illustrating the differences in output pressure over time for different classes of inflators.
FIGS. 17–22 are schematic illustrations of a second embodiment of a folding procedure for the cushion of the present invention.

To assist in explaining this effect, reference is made to FIG. 8. Here there is shown a graph of the pressure within a closed volume, over time, resulting from deployment of the three main classes of inflators: pyrotechnic, hybrid, and fluid fueled. It is to be understood that these are generalized pressure curves, and that variation is possible by altering the amount of pyrotechnic material, stored gas, etc.

As illustrated in FIG. 8, each of the classes of inflator has a characteristic pressure curve over time. From relative zero pressure at the start of deployment, each inflator will rapidly increase to a maximum pressure, shown here as occurring at approximately 10 ms. Thereafter, the pressure within the closed volume will taper off. It is in this tapering that the differences between inflator classes are most apparent. Specifically, hybrid inflators typically have a relatively fast pressure reduction, while pyrotechnic inflators have a more gradual pressure reduction. Fluid fueled inflators, however, such as that shown in U.S. Pat. No. 5,470,104 to Smith et al., fall within these extremes. Specifically, the fluid fueled inflator typically has a relatively fast initial pressure reduction, similar to the hybrid inflator. However, this is not continuous, and the rate of reduction slows in comparison to the hybrid for a short period of time before again increasing. This results in a slight pressure "bump" in the curve.

When used with the present cushion, and for the purpose of side-impact protection, it has been found that a fluid fueled inflator provides gas which is well suited for the initial inflation of the first volume, and that the pressure bump coincides very well to deployment of the second volume, and that the subsequent increase in the rate of pressure reduction coincides very well to the needed pressure reduction in the second volume. As such, no venting is necessary for such a side impact cushion when used with the fluid-fueled inflator. As may be envisioned, since there are no vents permitting the inflation gas to escape before compression by the passenger, this feature permits the use of a smaller and lighter inflator, since all gas produced will be used for cushioning, and none wasted.

The above description has mainly related to the function and structure of the cushion. This cushion arrangement provides the advantages noted above. Further advantages can be achieved in the mounting of the cushion to the inflator, and in the forming of a module. The mounting of the cushion of course depends upon the type of inflator employed, etc. A particularly advantageous arrangement is possible, however, when using an elongated cylindrical inflator (such as a fluid-fueled inflator).

Figure 9:
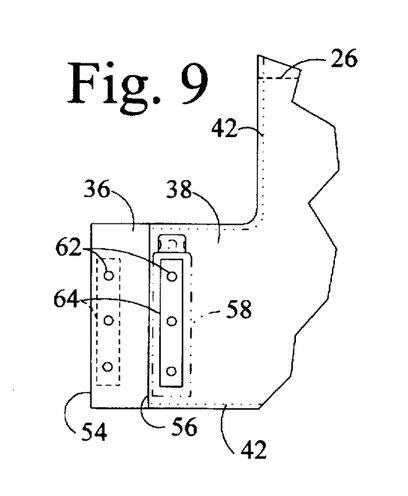
FIG. 9 is a detail side view of an uninflated cushion according to the present invention illustrating inflator mounting.

With reference to FIG. 9, the free end of the extension section 20 is shown. As may be seen, the sheets 36 and 38 have extension sections of different length, such that the free end 54 of sheet 36 is spaced from the free end 56 of sheet 38. As noted, the sheets are secured together at the majority of their periphery by the sew line 42. However, the free end 56 of sheet 38 is not secured to the sheet 36. As such, the free end 56 defines an access opening into the interior of first volume 22.

An inflator may be received within this access opening. The inflator is preferably of the cylindrical type, which typically include a diffuser (through which the gas exits) located at one longitudinal end. The inflator includes a plurality of mounting bolts 60 (FIG. 10) extending outward from its body, and these bolts are received though mating holes 62 in the sheet 38. In a similar manner, the sheet 36 also includes holes 62, located upon the sheet such that wrapping or folding the free end 54 over the inflator will bring the holes and bolts into alignment.

As may be envisioned, the folding of the free end 54 serves to substantially close the opening into the cushion. By then mounting the inflator to a structural item, such as a structural member 16' within the seat back 16, the free ends of the cushion will then be securely retained. Specifically, the free ends of the sheets will be held interposed between the inflator body and the seat back, with the bolts 60 further retaining the free ends. For improved reliability, the free ends may include appropriate fabric reinforcement 64 about the holes.

With this arrangement, while a small portion of generated gas may escape, the great majority of gas generated will fill the cushion. Furthermore, the assembly hardware is quite simple, requiring only the bolts on the inflator body and the holes in the cloth sheets. Additionally, the actual assembly operation is very simple in comparison to many cushion retaining arrangements. Other simple mounting arrangements, such as that shown in U.S. application Ser. No. 08/543,953 to Bunker et al., included herein by reference above, could also be employed.

In the arrangement shown in FIG. 9, the diffuser for the inflator is unmodified. Depending upon the type of inflator used, the exiting gas may have sufficient velocity, kinematic energy, etc. to damage the cushion. As such, it my be desirable to provide a deflector (not shown) spaced from the diffuser to channel the flow of gas away from vulnerable areas of the cushion. An alternative arrangement providing an encompassing diffuser is shown in FIG. 10.

In this embodiment the inflator is mounted within a diffuser casing 66. The casing includes a tubular sidewall 68 provided with a plurality of exit vents 70, typically along a limited angular extent. The sidewall is closed by a pair of end caps 72 (only one shown), with the inflator inside. The inflator may be retained in its coaxial position by providing the inflator with longitudinally extending pins and/or bolts 74 which engage with appropriate mating holes (not shown) in the end caps. With this arrangement the gas from the inflator is channeled through the exit vents before entering the first volume, reducing the possibility of cushion damage.

As is shown, the use of the diffuser casing 66 does not preclude the wrap-around cushion mounting described for FIG. 9. Specifically, the diffuser casing may be placed in the opening to the cushion and the free end 56 wrapped around the casing in a manner totally analogous to that shown in FIG. 9.

Figure 10:
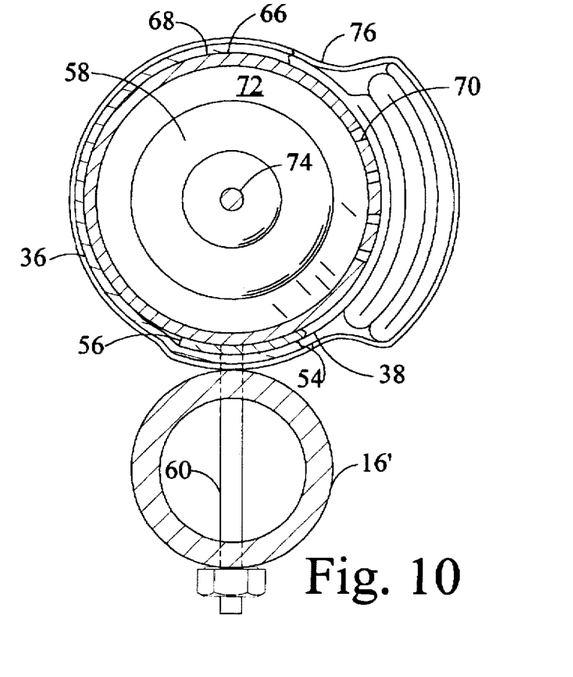
FIG. 10 is a top view, in partial cross-section, of a module according to the present invention mounted to a vehicle component.

FIG. 10 also shows a further advantageous module aspect, which is the retention of the folded cushion. Rather than providing a metal housing to receive the inflator/cushion combination, it is preferred that the folded cushion, resting against the exterior of the inflator (for the embodiment of FIG. 9) or diffuser casing (for the embodiment of FIG. 10), be secured in place by a frangible film 76. The film will enclose the circumference of the cushion, and is tightly wrapped to prevent unwanted movement of the cushion. The film may be a shrink wrap plastic, a non-shrink wrap plastic, or a paper. Depending upon the tear strength of the film, the film may have a series of perforations (not shown) to increase its frangibility. As may be envisioned, the film will securely retain the folded cushion in position during periods of inactivity. Upon deployment of the cushion, however, the force of the expanding cushion will tear or break the film, permitting complete inflation of the cushion.

The previous discussion has detailed the structure of the cushion, the mounting of the cushion to the inflator, and the mounting of a completed module to the vehicle. There is of course an intermediate step of folding the cushion to its storage configuration prior to securing it with the film 76. While various folding techniques may be employed, depending upon the placement and use of the module, for use as a side impact system there are preferred folding arrangements.

Figure 11:
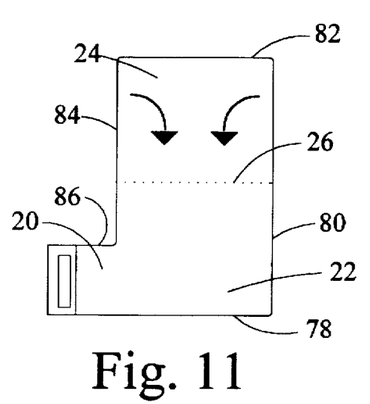
FIGS. 11–16 are schematic illustrations of a first embodiment of a folding procedure for the cushion of the present invention.

With reference to FIGS. 11–16, there is shown a first folding technique for a side impact cushion similar to those described above. In FIG. 11 the cushion is in its flat, initial condition, and has the general L shape as in FIG. 1. As such, the cushion includes the two overlaid sheets 36 and 38, each having a substantially aligned periphery including: a lower, horizontal edge 78 extending from the rear (the free end of the extension section 20) to the front; a front vertical edge 80; a top horizontal edge 82; a rear vertical edge 84; and an extension top edge 86.

Figure 12:
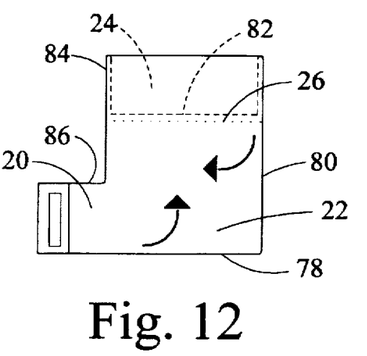
Figure 13:
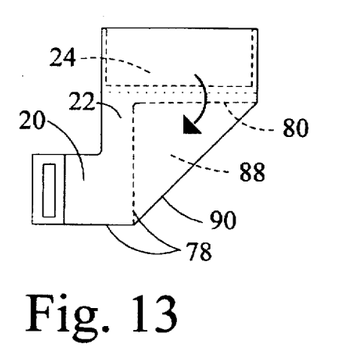

FIG. 12 shows the first step to be the securement of the second volume (if the second volume is to be secured against flapping). In this embodiment the second volume is secured by the partial inversion shown in FIG. 4, although the other securing arrangements illustrated above could also be used. For this inversion the top edge 82 is moved downward between the sheets 36 and 38, creating folds in the front and rear vertical edges 80 and 84.

Figure 14:
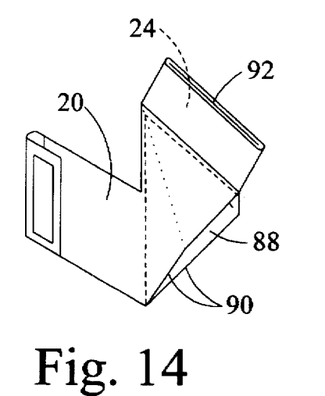

FIG. 14 shows the next step to be inversion of the lower forward corner. For this step the portion of the forward edge below the demarcation line 26 (or top edge 82 as made clear below) is rotated clockwise between the sheets 36 and 38 to be substantially parallel to the demarcation line 26 (or top edge 82). This causes a portion of the lower edge 78 to extend upward between the sheets, and creates a concave pocket 88 having folded side edges 90.

Figure 15:
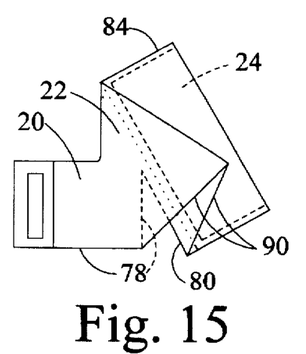
Figure 16:
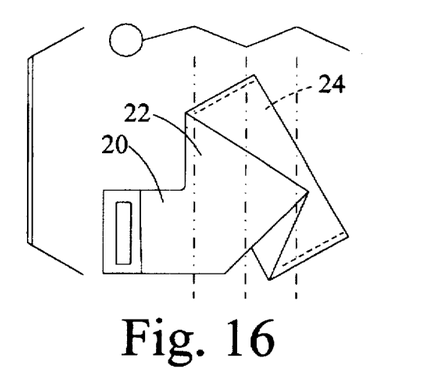
Figure 17:
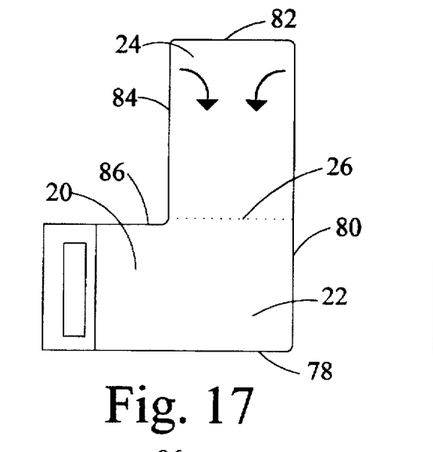
Figure 18:
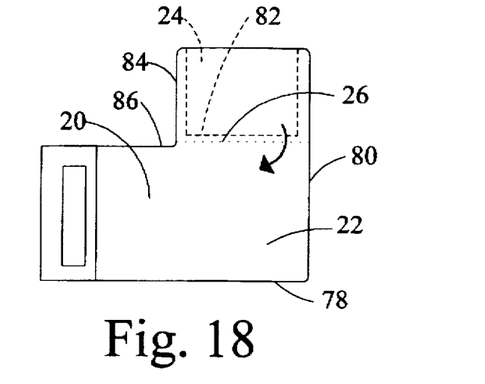

As shown in FIGS. 14 and 15, the next step is to spread the folded side edges 90 apart, opening the pocket 90. This action forces the inverted top edge and surrounding sheets to rotate downward. This downward rotation is continued at least until a large portion of the second volume is received between sheets 36 and 38, and at most until further rotation is blocked by the lower edge 78, whereupon the cushion is again made flat, causing each of the side edges 90 to be folded, and a portion of the second volume is received between the side edges. The final step, shown in FIG. 16, is to form a series of accordion folds along vertical lines, with four such folds being preferred. The resulting sections between these vertical folds are laid upon each other, resulting in a configuration similar to that shown in FIG. 10.

As may be envisioned, deployment of the cushion folded in this manner will first result in the cushion unfolding to the position shown in FIG. 15. This unfolding process moves in a predominantly forward direction and serves to position the first and second volumes alongside the passenger. This process also serves to initially move the cushion forward with a minimum profile, reducing the possibility that the cushion w ill be blocked. Thereafter, the cushion unfolds to the position of FIG. 13 by rotation of the second volume forward and upward, to complete the first volume inflation. This rotation of the second volume continues the forward momentum, and does not work against the natural flow of the cushion. Once the first volume is in proper position the unfolding process is essentially complete, as the deployment of the second volume is effected by the compression of the first volume. This deployment simply inverts the second volume to its original position. As may be seen, the deployment process produced by this fold arrangement is smooth, fast, and faces a minimum of possible obstruction.

While this arrangement has been described for a cushion having the initially inflated first volume and the compression inflated second volume, it is equally applicable to any L shape cushion. Specifically, if the cushion retained the same structure, but the inflator produced more gas, such that the second volume was inflated before any compression (as in U.S. Pat. No. 5,454,595, issued Oct. 03, 1995), this fold arrangement would still be applicable. Furthermore, an L shape cushion having no demarcation line 26 or seal line 50, thus simply having a single L shaped volume, could also be folded advantageously in this manner.

An alternative fold arrangement for this same cushion is shown in FIGS. 17–22. As with the previous embodiment, the cushion is shown in the initial flat condition in FIG. 17, and with the second volume secured in FIG. 18. It is noted that the inversion of the second volume produces a concave top pocket 92 (FIG. 20) having the top edge 82 at its innermost edge.

In a departure from the previous embodiment, at this point the upper forward corner (rather than the lower as shown before) of the first volume is inverted as shown in FIGS. 19 and 20 such that the forward vertical edge 80 of the first volume is rotated to be substantially parallel to the lower edge 78 and between the sheets 36 and 38. As before, this step creates a concave pocket 88' having folded side edges 90'. In this embodiment, however the second volume is placed between these side edges with this step alone.

The previous step forms a triangular corner 94 at the forward lower edge, consisting of the lower edge 78 and the two side edges 90'. In the next, optional, step, the triangular lower forward corner is folded back upon itself, in the manner of an inversion, such that the corner 94 is tucked between one of the side edges 90' and the second volume. Alternatively, if the second volume has been secured by the partial inversion of FIG. 4, the corner may be tucked into the pocket 92. This is shown in FIG. 21. The final step, shown in FIG. 22, is identical to that in the previous embodiment, and the accordion folds again produce a configuration similar to that shown in FIG. 10.

As may be envisioned, this again results in a folded cushion which deploys reliably and quickly. As before, the accordion folds expand first, positioning the first and second volumes adjacent the passenger, and in the form of FIG. 21.

Thereafter, the second volume 24 is rotated forward and upward, forcing out the corner 94 (if tucked in). This arrangement thus performs in a similar manner and with similar advantages to the first fold arrangement.

While various arrangements have been shown in FIGS. 3–7 for securing the second volume, the preferred arrangement is the partial inversion of FIG. 4. This partial inversion technique may also be used to advantage in folding standard side-impact cushions (i.e., those which have only a single volume) mounted to a seat back as previously shown. Three folding techniques using such inversions will now be described.

Figure 23:
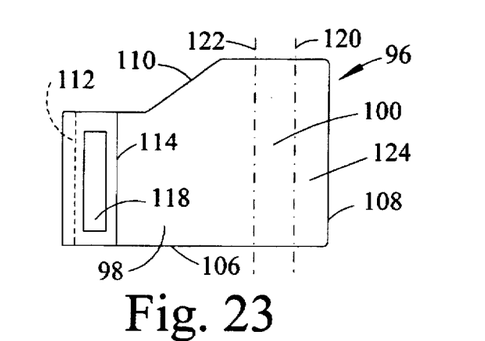
FIGS. 23–30 are schematic illustrations of a first inventive embodiment of a folding procedure for a standard cushion.
Figure 24:
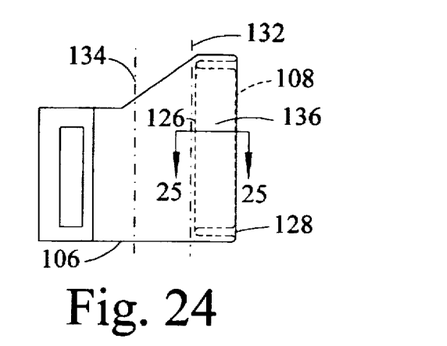

With reference to FIGS. 23–30, a first technique is shown for folding a standard side impact cushion, generally designated by reference numeral 96 in FIG. 23. In a manner analogous to the previous cushion, this cushion 96 includes an extension section 98 leading to, and in communication with, a main volume 100. As before, the free end of the extension section will be attached to an inflator mounted upon the outer edge of a passenger seat back. The cushion is formed of first and second sheets 102 and 104 (FIG. 25) of flexible fabric, laid upon each other with their substantially similar peripheries aligned.

Figure 25:
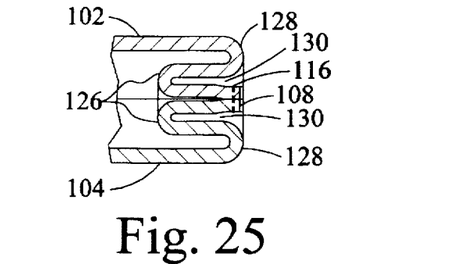
Figure 26:
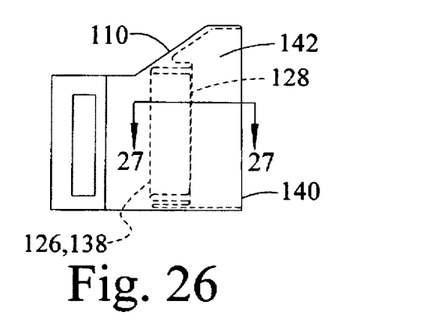

These peripheries include a lower horizontal edge 106, a forward vertical edge 108, a top edge 110, and free ends 112 and 114, respectively. The top edge 110 may be strictly horizontal, or, as shown, may include an angled portion to provide a larger vertical extent to the main volume. The edges 106–110 are secured together, as by a sew line 116 (FIG. 25). As before, the free ends 112 and 114 define an opening through which the inflation gas may flow, and the free ends may include appropriate bolt holes (not shown) and reinforcement 118 for mounting the cushion to the inflator in a manner analogous to that shown in FIGS. 9 and 10. The cushion, when deployed will move forward from the seat back, between the passenger and the side 14 of the cabin. When fully deployed, the main volume will be located intermediate the torso (and possibly head) of the passenger and the side 14 of the cabin.

Having described this cushion, the folding process will now be detailed. With reference to FIG. 23, the cushion is first laid out flat in its deployed form. First and second imaginary vertical lines 120 and 122 are then defined over the flat cushion. The first line 120 is spaced from the front vertical edge 108 by a distance of approximately one fifth of the horizontal length of the cushion to define a forward end 124 between the line 120 and edge 108. The second line 122 is spaced from the first line 120 by an approximately equal distance.

The forward end 124 is then clamped to hold the sheets 102 and 104 together. Thereafter, the sheets 102 and 104 are separated along the second line 122, and the clamped front end is moved rearward between the sheets. This is continued until the front edge 108 is located at the position of the second line 122, and results in the configuration shown in FIGS. 24 and 25. As may best be seen in FIG. 25, this creates a pair of inner folds 126 at the rear of the forward end, and a pair of outer folds 128 adjacent the front edge 108. This defines a pocket groove 130 between the outer folds 128 and the forward end 124. It should be clear that this pocket groove, when viewed from the front, is actually an elongated elliptical groove surrounding the front edge 108. It is also noted that this does not result in a true inversion of the forward end, but what is referred to herein as an accordion inversion. While not preferred, a true inversion could be employed.

At this time third and fourth imaginary vertical lines 132 and 134 are defined. The third imaginary line is spaced from the outer fold by a distance approximately equal to that of the previous lines and defines an intermediate end 136 between line 134 and outer folds 128. The fourth line, however, is spaced from the third line by a greater distance. While variable, this greater distance will be between approximately 1.2–2 times the previous line spacing, with 2 times being preferred. As before, the intermediate end 136 is clamped to hold the sheets together, while the sheets are separated at the fourth line. The intermediate end is then inserted between the sheets until the outer folds 128 are approximately at the position of the fourth line 134. This results in the configuration shown in FIGS. 26 and 27.

Figure 27:
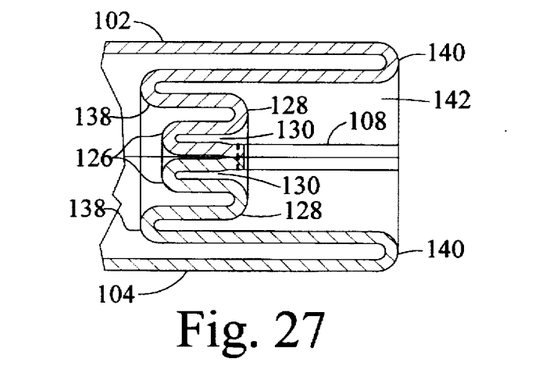

As is best seen in FIG. 27, this step forms another accordion inversion, resulting in an interior fold 138 and an exterior fold 140. It is noted that the common spacing between the third line and the outer fold results in the inner fold 126 and the interior fold 128 being in proximity. However, the increased spacing between the third and fourth lines results in the exterior fold 140 defining a collar 142 extending forward of the outer fold 128. Again, this collar will appear as an elongated ellipse when viewed from the front.

Figure 28:
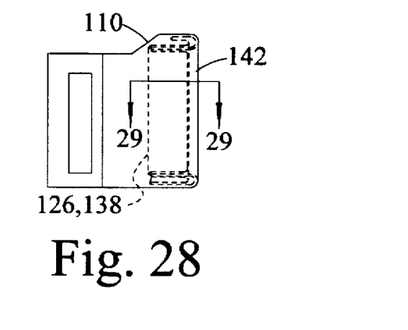
Figure 29:
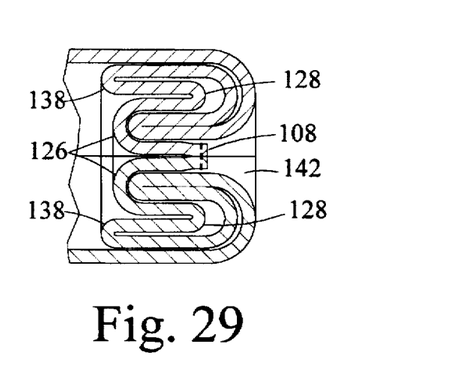
Figure 30:
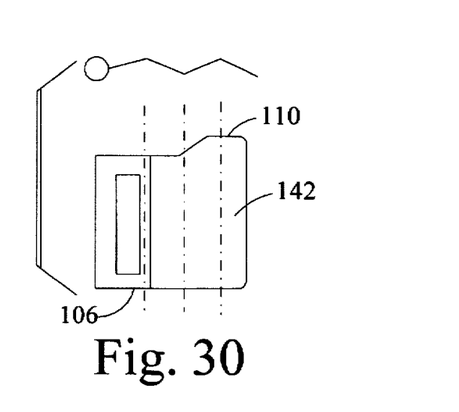

The penultimate step in this process is to fold the collar 142 inward and into the pocket groove 130. This configuration is shown in FIGS. 28 and 29. As may be envisioned, the collar will be releasably held in this position by the friction generated in the pocket groove, with the exterior fold 140 being closely adjacent to the inner fold 126. The final step is illustrated in FIG. 30, and consists of forming one or more accordion folds, causing the fully folded cushion to take a configuration similar to that shown in FIG. 10.

During deployment of the cushion 96 folded in this manner, the inflation steps are essentially reversed from folding. Specifically, the accordion folds of FIG. 30 are first reversed, bringing the cushion to the FIG. 28 configuration. The pressure within the cushion will then cause the collar 142 to disengage from the pocket groove 130. It is noted that during this step the exterior folds move laterally outward of the cushion, and are thus less likely to become entangled compared to a laterally inward movement. This outward movement may also serve to move the sheets 102 and 104 laterally away from the interior folds 138, possibly creating a preferred gas flow into the collar such that the intermediate end 136 moves forward substantially intact, to the configuration shown in FIGS. 24 and 25.

The final step is the forward movement of the forward end 124 to its fully extended position, shown in FIG. 23. It may thus be seen that the fold arrangement of the invention provides a side impact cushion which deploys in a true forward direction. Furthermore, the cushion maintains a minimum cross-section during this forward movement to avoid possible entanglement. This provides a deployment which is fast, reliable and safe.

The second folding technique for the cushion 96 is shown in FIGS. 23, 25 and 31–38. The cushion 96 is the same as in the previous folding technique, and as such is shown in FIG. 23. As before, the cushion 96 is first laid flat, and the first and second imaginary lines 120 and 122 are defined as in FIG. 23. In this embodiment, however, the spacing between the front edge and the first line and between the first and second lines, may be approximately one fourth of the cushion length. Also as before, the forward end 124 is clamped, the sheets separated at the second line 122, and the forward end inserted between the sheets until the front edge 108 is approximately aligned with the second line 122. This results in the configuration shown in FIGS. 25 and 31, which correspond to the first folding technique. As before, inner and outer folds 126 and 128 are formed by this accordion inversion.

Figure 31:
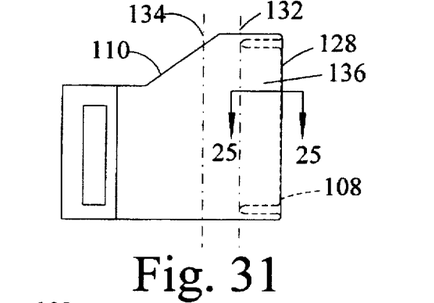
FIGS. 31–38 are schematic illustrations of a second inventive embodiment of a folding procedure for a standard cushion.

Also as with the first technique, third and fourth imaginary lines 132 and 134 are defined, as shown in FIG. 31. The third imaginary line is again located approximately over the inner fold 126, and defines an intermediate end 136 between the third line 132 and the outer fold 128. In this technique, however, the spacing between the third and fourth lines is approximately equal to the spacing between the third line 132 and the outer fold. The intermediate end 136 is then clamped, the sheets separated at the fourth line 134, and the intermediate end inserted between the sheets until the outer fold 128 is approximately aligned with the fourth line 134.

Figure 32:
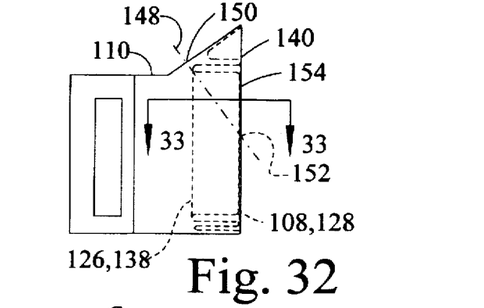
Figure 33:
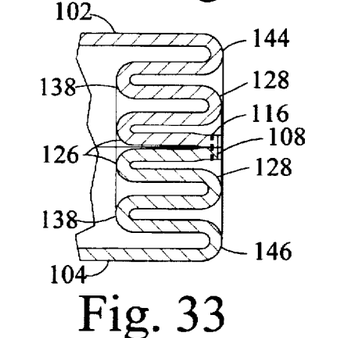

This again creates the interior fold 138, and the exterior fold 140, which for this technique is further specified as a lower exterior fold 144 in the first sheet 102 and an upper exterior fold 146 in the second sheet 104. This configuration is shown in FIGS. 32 and 33. It is noted that the equal spacing between the third and fourth lines 132 and 134 results in the exterior folds being in close proximity to the outer folds 128.

At this time an imaginary angle line 148 is defined. The angle line extends between a first point 150 on the top edge 110, spaced from the exterior folds, and a second point 152 on the exterior fold, spaced from the top edge 110. A pull point 154 is also defined on the exterior folds, at a position intermediate (and preferably at the mid-point between) the top edge 110 and the second point 152.

Figure 34:
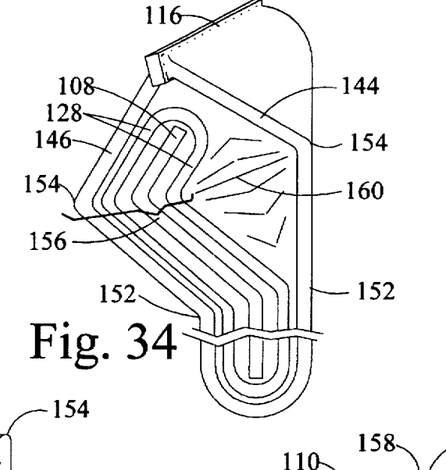
Figure 35:
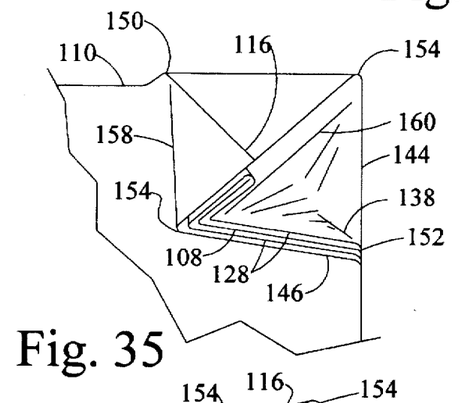

The next step in the process is to clamp the sheets together at the first and second points 150 and 152. Thereafter, the front edge 108, the outer folds 128, and the upper exterior fold 146 are loosely clamped together at the pull point 154, and are referred to as held folds 156. The held folds 156 are then lifted from the lower exterior fold 144, at the pull point, and are folded over about the imaginary angle line 148. This is illustrated in FIG. 34. This folding is continued until the held folds 156 are folded over onto the exterior of the second sheet 104, as illustrated in FIG. 35. As shown, this results in the held folds also being folded along a pull line 158 connecting the pull point 154 and the first point 150.

During the initial folding of the held folds there may be some slight relative movement of the outer folds 128 and front edge 108 with respect to the upper exterior fold 146. However, for the most part the movement of the held folds away from the lower exterior fold 144 is permitted by a partial unfolding of the interior fold 138 adjacent the lower exterior fold 144. This unfolding is most pronounced along a starter line 160 connecting the two separated pull points 154 shown in FIG. 35, where the fabric of the first sheet is pulled taut. It is noted that during this folding step the sew line 116 between the first and second sheets (exaggerated at the top of FIG. 34 for clarity) is moved to angle downward between the two pull points 154.

Figure 36:
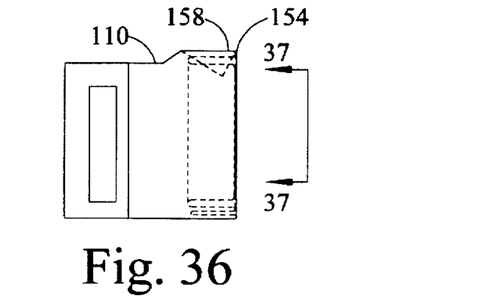
Figure 37:
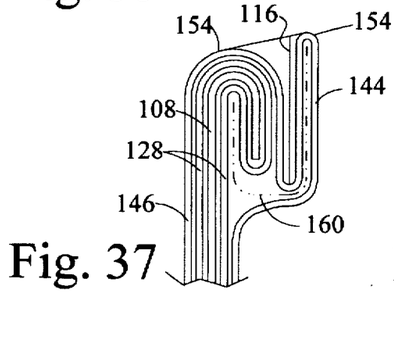
Figure 38:
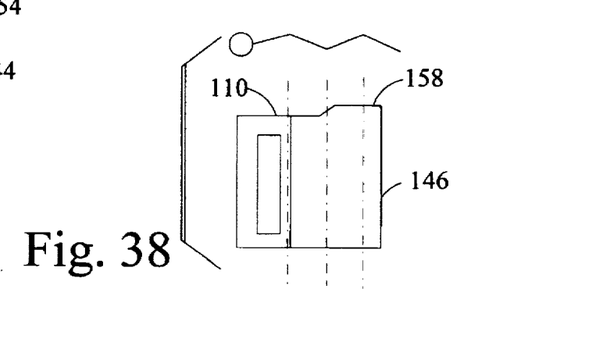

The penultimate step in this folding technique is to clamp the held folds along the pull line 158, and rotate the held folds in the reverse direction about the imaginary angle line 148. During this step the sew line 116 is maintained in the position shown in FIG. 35, such that the sew line between the first and second points 150 and 152 becomes a fold line. This is continued until the two pull points are again laying upon each other and the held folds are lying flat upon the lower exterior fold 144 with the sew line therebetween. This is illustrated in FIGS. 36 and 37. As is best shown in FIG. 37, the starter line 160 is now visible from the front end at a point just below the sew line 116. As with the previous embodiment, the final step is a series of accordion folds to produce a final form similar to that in FIG. 10.

As would be expected, the deployment of the cushion 96 folded using this second technique is substantially the reverse of the folding process. As before, the first deployment step is the unfolding of the accordion folds to achieve the condition shown in FIGS. 36 and 37. At this point the inflation gas begins to exert pressure against the accordion inverted intermediate and forward ends 124 and 136. In general, the pressure then forces the various folds to reverse and inflate the cushion.

Specifically, the various inner, outer, interior and exterior folds are in close proximity to each other, and have a substantial depth (i.e., the spacing between the vertical imaginary lines). As such, there is an appreciable amount of friction between the folds, which resists inflation. However, the starter line 160 has much less of this friction. First, the starter line is located in an area where the spacing between adjacent folds is the greatest, reducing the force upon the starter line. Additionally, the depth of the starter line is much less that the other folds, since the depth was reduced during the step of folding the held folds. As such, the inflation pressure will typically force the starter line outward before other areas of folds.

While this inflation begins at the starter line, it quickly expands around the elliptical interior fold 138, forcing the forward end 124 outward as a unit, to form a configuration as shown in FIGS. 25 and 32. Inflation continues with the forcing out of the inner folds 126 to achieve the full inflated form of FIG. 23. In this manner the intermediate, and then the forward ends are inflated in order. This may help to ensure that the cushion will move forward with the minimum cross-section, since the folded and accordion inverted forward end is smaller than the inflated forward end. As such, it may be seen that the present fold technique reduces the possibility of cushion entanglement, while providing a fast and reliable deployment.

The third and final folding technique for the cushion 96 is shown in FIGS. 23, 25, 31, 33 and 39–42. The cushion 96 is the same as in the previous folding techniques, and as such is shown in FIG. 23. As before, the cushion 96 is first laid flat, and the first and second imaginary lines 120 and 122 are defined as in FIG. 23. In this embodiment, however, the spacing between the front edge and the first line and between the first and second lines, may be approximately one fourth of the cushion length. Also as before, the forward end 124 is clamped, the sheets separated at the second line 122, and the forward end inserted between the sheets until the front edge 108 is approximately aligned with the second line 122. This results in the configuration shown in FIGS. 25 and 31, which correspond to the first folding technique. As before, inner and outer folds 126 and 128 are formed by this accordion inversion.

As with the second technique, third and fourth imaginary lines 132 and 134 are defined, as shown in FIG. 31. The third imaginary line is again located approximately over the inner fold 126, and defines an intermediate end 136 between the third line 132 and the outer fold 128. The spacing between the third and fourth lines is again approximately equal to the spacing between the third line 132 and the outer fold. The intermediate end 136 is then clamped, the sheets separated at the fourth line 134, and the intermediate end inserted between the sheets until the outer fold 128 is approximately aligned with the fourth line 134.

Figure 39:
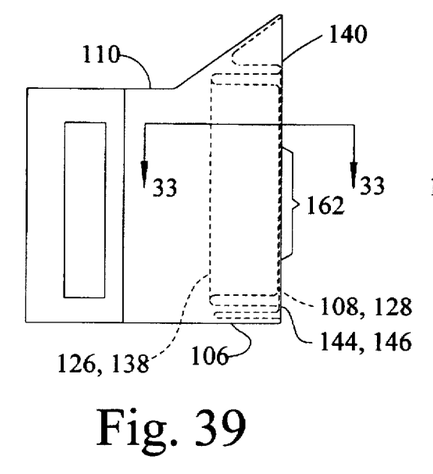
FIGS. 39–42 are schematic illustrations of a third inventive embodiment of a folding procedure for a standard cushion.

This again creates the interior fold 138, and the exterior fold 140, which is again further specified as a lower exterior fold 144 in the first sheet 102 and an upper exterior fold 146 in the second sheet 104. This configuration is shown in FIGS. 33 and 39. The equal spacing between the third and fourth lines 132 and 134 again results in the exterior folds being in close proximity to the outer folds 128.

Figure 40:
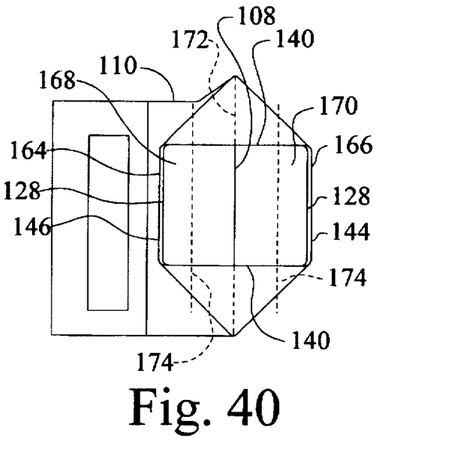

At this point the final folding technique departs from the previous technique. In this third folding embodiment, a central section of the exterior fold 140 is defined as a clamping section 162, with the upper and lower ends of the clamping section being spaced from both the lower edge 106 and top edge 110. Within this clamping section the upper exterior fold 146 is clamped to the adjacent portion of the adjacent outer fold 128, creating an upper pull section 164 (FIG. 40). Similarly, the lower exterior fold 144, within the clamping section 162, is clamped to the adjacent portion of its adjacent outer fold 128, creating a lower pull section 166.

The upper and lower pull sections 164 and 166 are then moved away from each other, spreading apart the inner folds 126. This is continued until the exterior fold 140 between the clamping sections are pulled taut, as indicated by the horizontal sections of the fold 140 in FIG. 40. This forms upper and lower trapezoidal wings 168 and 170, each extending outward from, and connected to, a central vertical line 172. It is noted that the length of the clamping section will affect the distance the clamping sections may be pulled apart. It is preferred that the length is chosen such that the distance between the pull section 164 and 166 in FIG. 40 is approximately twice the length between the inner and outer folds 126 and 128.

It is noted that the front vertical edge 108 remains in the center between the pull sections. During the spreading process the fabric between the inner fold 126 and the edge 108 will be compressed inward along a series of random pleats (not shown) by the surrounding fabric, so that the edge 108 remains in a plane containing the pull sections. Alternatively, the edge 108 could be clamped together to the upper or the lower pull section 164 or 166, and thus folded over. Either arrangement is acceptable.

Figure 41:
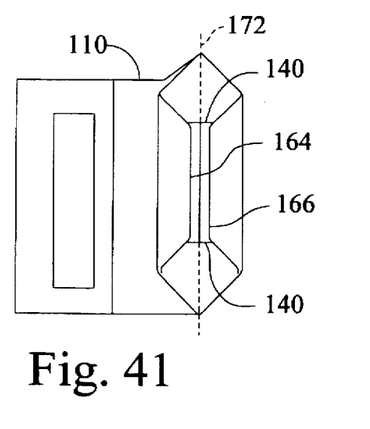
Figure 42:
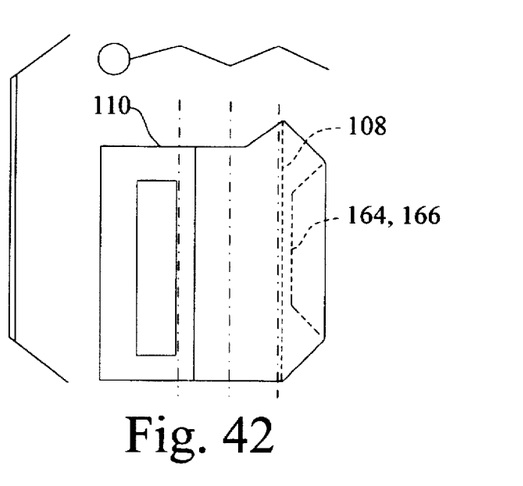

At this point two vertical fold lines 174 are defined, one approximately centered between each of the pull sections 164, 166 and the central vertical line 172. The sections of the wings beyond these fold lines are clamped in position and folded inward about the associated vertical line 174 to rest upon the wing. This arrangement is shown in FIG. 41. Thereafter, the two wings are folded about the central vertical line 172 to lie upon each other within the plane of the remainder of the cushion. This is shown in FIG. 42. As the final step, the resulting cushion is subjected to a series of accordion folds to produce a final form similar to that in FIG. 10.

Again, the deployment sequence is substantially the reverse of the folding process. In this arrangement, the folding of the wings is the main difference from the previous embodiment. After initially unfolding the accordion folds, the wings will unfold, in reverse order to that described, to reach the form of FIG. 39. This is assisted by the pressure of the gas, but the fabric may have some resistance to the various folds such that unfolding is also urged by the fabric itself. Thereafter, the deployment is similar to that described above. Again, the deployment is reliable, fast and directed substantially in the forward direction.

Figure 43:
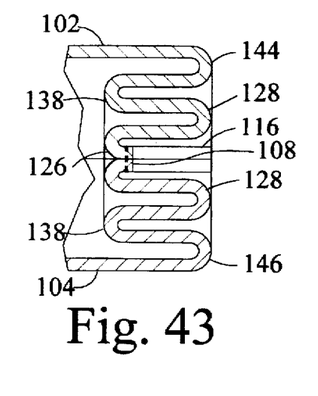
FIG. 43 is a cross-sectional view similar to that taken along line 33–33 of FIG. 32, illustrating a second inversion embodiment.

As noted above, in each of the three embodiments shown for folding the standard side-impact cushion, the initial folds have been formed using an accordion inversion, rather than a true inversion. This results in the edge 108 extending outward from the folds 126 in FIG. 25. It is possible, however, to use a true inversion. In the embodiments described, the first step would be to invert the portion of the cushion which is forward of the line 120, rather than to clamp and invert the forward end 124. The remaining steps would all be equivalent, and would result in a configuration as shown in FIG. 43, which is a view similar to that shown in FIG. 33. As may be seen, the volume between the fold 128 may easily receive the collar 142 for the first embodiment, be clamped together for the second embodiment, or be spread apart for the third embodiment. As such, true inversions may also be used with little impact upon the operation of the cushion.

Figure 44:
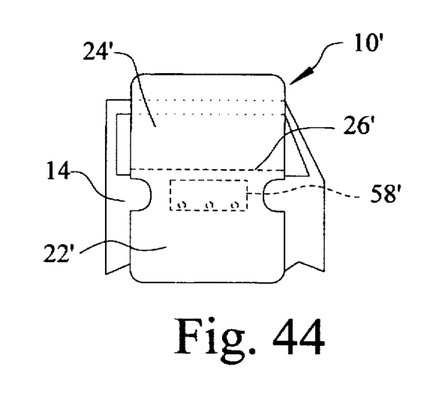
FIG. 44 is a side view of a second embodiment of a cushion according to the invention.

While side-impact cushions mounted upon the seat back have been discussed in detail, it should be noted that the present concept of using two volumes, with the second volume being deployed by compression of the first volume, is not so limited. For example, this concept may be applied to a side-impact cushion mounted to a door similar to that shown in U.S. Pat. No. 5,324,072. As illustrated in FIG. 44, such a cushion 10' has a generally rectangular form, with first and second sheets joined about their periphery. One of the sheets includes an opening near its center, through which an inflator 58' is mounted. As disclosed in that patent, it is preferred to inflate the lower portion of the cushion first, then the upper portion. This adapts well to the present invention, and the lower portion, including the inflator, may comprise a first volume 22', while the upper portion comprises a second volume 24'. As with the first embodiment of the cushion, the volumes are separated by a demarcation line 26' which includes a flow restriction. The restriction may take any form described herein. The operation of the cushion will be analogous to that described above, and provide all the same advantages, with the sole exception of movement with the seat. Other arrangements are of course possible.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method of protecting an occupant in a cabin of a vehicle upon detection of a collision, comprising the steps of:

providing a vehicle with an inflator;

providing said vehicle with a cushion, said cushion including a first volume communicating with said inflator and a second volume communicating with said first volume;

causing said inflator to produce a quantity of inflation gas initially received in said first volume;

restricting the flow of said inflation gas between said first and second volumes to maintain said first volume at an operative pressure and said second volume at a partially inflated, less-than-operative pressure;

permitting a first portion of the occupant's body to compress said first volume, said compression forcing at least a portion of said inflation gas from said first volume into said second volume to raise said second volume to an operative pressure; and permitting a second portion of the occupant's body to compress said second volume.

2. A method as in claim 1, wherein said step of restricting flow to maintain said first volume at an operative pressure further includes causing said first volume to extend between a side of said vehicle and said occupant.

3. A method as in claim 2, wherein said first portion of said occupant's body is a torso, and said second portion of said occupant's body is a head.

4. A method as in claim 1, wherein said first portion of said occupant's body is a torso, and said second portion of said occupant's body is a head.

5. A cushion for an airbag passive restraint system, comprising:

a flexible fabric covering including an inlet for receiving inflation gas from an inflator, said covering forming first and second volumes, said first volume being in direct communication with said inlet and being constructed and arranged to be located, upon inflation, for protecting a first portion of a passenger's body, said second volume being in communication with said first volume and being constructed and arranged to be located, upon inflation, for protecting a second portion of the passenger's body, said first and second volumes being separated by a demarcation line; and a flow restriction located in proximity to said demarcation line and intermediate said first and second volumes, said flow restriction restricting flow of the inflation gas when the pressure within said first volume is below a predetermined pressure to thus prevent inflation of said second volume, yet permitting flow of the inflation gas when the pressure within said first volume is above said predetermined pressure to thus cause inflation of said second volume, and wherein said flow restriction includes a seal line between said first and second volumes, said seal line failing upon said predetermined pressure being reached in said first volume.

6. A cushion as in claim 5, wherein said seal line includes a frangible connection between at least portions of opposing faces of said covering.

7. A cushion for an airbag passive restraint system, comprising:

a flexible fabric covering including an inlet for receiving inflation gas from an inflator, said covering forming first and second volumes, said first volume being in direct communication with said inlet and being constructed and arranged to be located, upon inflation, for protecting a first portion of a passenger's body, and said second volume being in communication with said first volume and being constructed and arranged to be located, upon inflation, for protecting a second portion of the passenger's body, said first and second volumes being separated by a demarcation line; and a flow restriction located in proximity to said demarcation line and intermediate said first and second volumes, said flow restriction restricting flow of the inflation gas when the pressure within said first volume is below a predetermined pressure to thus prevent inflation of said second volume, yet permitting flow of the inflation gas when the pressure within said first volume is above said predetermined pressure to thus cause inflation of said second volume, and wherein said flow restriction includes a fold line located between said first and second volumes, said fold line being formed by said second volume being folded with respect to said first volume.

8. A cushion as in claim 7, wherein said second volume is folded over to lie flat against said first volume, and said second volume is frangibly secured against said first volume.

9. A cushion as in claim 7, wherein said second volume is rolled along a line parallel to said fold line, and is frangibly secured to said first volume.

10. A cushion as in claim 7, wherein said covering takes a generally L-shaped form, including:
- a base, said base of said L forming an extension section, said extension section being constructed and arranged for communication with an inflator; and
- an upright, a lower portion of said upright forming said first volume, and an upper portion of said upright forming said second volume.

11. A method of folding an airbag cushion, comprising the steps of:
- providing a cushion having first and second sheets in overlying relation, at least a portion of said cushion having the general form of a rectangle with said sheets secured together along bottom, front, top and rear edges;
- defining a line extending across said cushion from said rear to said front edge intermediate said top and bottom edges, an upper portion being defined above said line;
- holding said sheets together in said upper portion while separating said sheets below said line;
- rotating said upper portion about the intersection of said line and said rear edge, to thus place said upper portion between said sheets; and
- forming a series of accordion folds along lines parallel to said rear edge, in its original position.

12. A method as in claim 11, wherein said rotating step continues until said line is substantially parallel with the original position of said real edge, and a portion of said front edge above said line is substantially parallel with said bottom edge, said upper portion being located between folded side edges extending from a lower end of said front edge to said intersection of said line and said rear edge.

13. A method as in claim 11, further including, prior to said holding step, the steps of:
- defining a lower front corner at the intersection of said bottom and front edges;
- separating said sheets at a central location within said edges, and thereafter inverting said lower front corner such between said sheets such that a portion of said front edge below said line extends between said sheets substantially parallel to said line, and a portion of said bottom edge extends upward between said sheets, folded side edges being formed between remaining portions of said front and bottom edges,
- and wherein, in said holding step, said step of separating said sheets comprises separating said folded side edges.

14. A method of folding an airbag cushion, comprising the steps of:
- providing a cushion having first and second sheets in overlying relation, at least a portion of said cushion having the general form of a rectangle with said sheets secured together along bottom, front, top and rear edges;
- inverting a portion of said cushion to place said front edge between said first and second sheets, resulting in an outer fold parallel to said front edge;
- defining third and fourth imaginary lines extending across said cushion from said top to said bottom edge, said third line being spaced from said outer fold by a distance and defining therebetween an intermediate end, and said fourth line being spaced from said third line by a distance,
- holding said sheets together at said intermediate end while separating said sheets between said fourth line and said rear edge;
- inserting said intermediate end between said sheets until said front edge is between said sheets.

15. The method of claim 14, comprising the further step of:
- forming a series of accordion folds along lines parallel to said rear edge, in its original position.

16. The method of claim 14, wherein a pocket groove is formed within said outer fold, and said distance between said fourth line and said third line is greater than said distance between said third line and said outer fold, to form a collar extending outward of said outer fold, and comprising the further step of folding said collar inward within said pocket groove.

17. The method of claim 16, wherein said step of inverting said front edge comprises:
- defining first and second imaginary lines extending across said cushion from said top to said bottom edge, said first line being spaced from said front edge by a distance and defining therebetween a forward end, and said second line being spaced from said first line by a distance,
- holding said sheets together at said forward end while separating said sheets between said first line and said rear edge; and
- inserting said forward end between said sheets until said front edge is approximately aligned with said second line.

18. The method of claim 14, wherein said second line defines said outer fold, and said third line defines an exterior fold, and comprising the further steps of:
- defining an imaginary angle line from said first point on said rear edge to a second point on said front edge, and further defining a pull point on said front edge between said second point and said top edge;
- holding said sheets together between said angle line and said bottom edge;
- clamping together said outer folds and one of said exterior folds at said pull point to define clamped folds;
- separating said clamped folds from said one of said exterior folds to define a pull line between said pull point on said clamped folds and said first point on said rear edge;
- clamping said sheets along said pull line; and
- folding said clamped folds back into position to bring said pull points back onto overlying relation.

19. The method of claim 14, wherein said second line defines said outer fold, and said third line defines an exterior fold, and comprising the further steps of:
- fixing said exterior folds to the adjacent outer folds along a clamping section intermediate said upper and lower edges, thus defining upper and lower pull sections;
- separating said upper pull sections to bring the portion of the exterior fold between said pull sections into a taut condition, and thus defining upper and lower wings;
- folding an outer edge of each of said wings inward upon itself about a vertical line; and folding said wings to lie upon each other in a plane containing the remainder of said cushion.

20. A cushion for an airbag passive restraint system, comprising:

a flexible fabric covering including an inlet for receiving inflation gas from an inflator, said covering forming first and second volumes, said first volume being in communication with said inlet and being constructed and arranged to be located, upon inflation, for protecting a first portion of a passenger's body, and said second volume being in communication with said first volume and being constructed and arranged to be located, upon inflation, for protecting a second portion of the passenger's body; and a flow restriction located intermediate said first and second volumes restricting the flow of the inflation gas from said first volume to said second volume, said flow restriction providing a sufficient restriction on flow to maintain said first volume at an operative pressure, and said second volume at a partially inflated, less-than-operative pressure, prior to loading of said first volume by said first portion of a passenger's body, yet said flow restriction permitting sufficient flow to allow a quantity of the inflation gas to flow from said first volume to said second volume, upon said loading of said first volume, to raise said second volume to an operative pressure.

21. A cushion as in claim 20, wherein said flow restriction includes a baffle positioned between said first and second volumes.

22. A cushion as in claim 21, wherein said baffle includes a strip of flexible material within said covering, said strip of material including a plurality of vent holes extending therethrough.

23. An airbag module, comprising:

an inflator for producing a quantity of inflation gas;

a flexible fabric covering including an inlet for receiving said inflation gas, said covering forming first and second volumes, said first volume being in communication with said inlet and being constructed and arranged to be located, upon inflation, for protecting a first portion of a passenger's body, and said second volume being in communication with said first volume and being constructed and arranged to be located, upon inflation, for protecting a second portion of the passenger's body; and a flow restriction located intermediate said first and second volumes restricting the flow of the inflation gas from said first volume to said second volume, said flow restriction providing a sufficient restriction on flow to maintain said first volume at an operative pressure, and said second volume at a partially inflated, less-than-operative pressure, prior to loading of said first volume by said first portion of a passenger's body, yet said flow restriction permitting sufficient flow to allow a quantity of the inflation gas to flow from said first volume to said second volume, upon said loading of said first volume, to raise said second volume to an operative pressure.

24. A module as in claim 23, mounted to a seat back in a vehicle cabin, said module being mounted such that said cushion inflates to a position with said first and second volumes between an occupant of said vehicle and a side of said vehicle.

25. A module as in claim 24, wherein said cushion is generally L-shaped, including a base forming an extension section, said extension section communicating with said inflator, and an upright, communicating with said extension section, a lower portion of said upright forming said first volume, and an upper portion of said upright forming said second volume.

* * * * *